(12) United States Patent
Bhargava et al.

(10) Patent No.: US 8,667,257 B2
(45) Date of Patent: Mar. 4, 2014

(54) DETECTING BRANCH DIRECTION AND TARGET ADDRESS PATTERN AND SUPPLYING FETCH ADDRESS BY REPLAY UNIT INSTEAD OF BRANCH PREDICTION UNIT

(75) Inventors: Ravindra N. Bhargava, Austin, TX (US); David Suggs, Austin, TX (US); Anthony X. Jarvis, Acton, MA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 634 days.

(21) Appl. No.: 12/943,859

(22) Filed: Nov. 10, 2010

(65) Prior Publication Data
US 2012/0117362 A1 May 10, 2012

(51) Int. Cl.
*G06F 9/38* (2006.01)
(52) U.S. Cl.
USPC ............................. 712/237; 712/207; 712/239
(58) Field of Classification Search
None
See application file for complete search history.

(56) References Cited

U.S. PATENT DOCUMENTS

| 5,835,745 | A | 10/1978 | Yoshida et al. |
| 5,228,131 | A | 7/1993 | Ueda et al. |
| 5,564,118 | A | 10/1996 | Steely et al. |
| 7,024,545 | B1 | 4/2006 | Zuraski et al. |
| 7,681,021 | B2 | 3/2010 | Schuler et al. |
| 2004/0181654 | A1 | 9/2004 | Chen |
| 2005/0257035 | A1* | 11/2005 | Prasky et al. ................. 712/238 |
| 2009/0217017 | A1 | 8/2009 | Alexander et al. |

* cited by examiner

*Primary Examiner* — Kenneth Kim
(74) *Attorney, Agent, or Firm* — Meyertons, Hood, Kivlin, Kowert & Goetzel, P.C.; Paul T. Seegers

(57) ABSTRACT

Techniques are disclosed relating to improving the performance of branch prediction in processors. In one embodiment, a processor is disclosed that includes a branch prediction unit configured to predict a sequence of instructions to be issued by the processor for execution. The processor also includes a pattern detection unit configured to detect a pattern in the predicted sequence of instructions, where the pattern includes a plurality of predicted instructions. In response to the pattern detection unit detecting the pattern, the processor is configured to switch from issuing instructions predicted by the branch prediction unit to issuing the plurality of instructions. In some embodiments, the processor includes a replay unit that is configured to replay fetch addresses to an instruction fetch unit to cause the plurality of predicted instructions to be issued.

19 Claims, 5 Drawing Sheets

DETECTING BRANCH DIRECTION AND TARGET ADDRESS PATTERN AND SUPPLYING FETCH ADDRESS BY REPLAY UNIT INSTEAD OF BRANCH PREDICTION UNIT

BACKGROUND

1. Technical Field

This disclosure relates generally to processors, and, more specifically, to branch prediction within processors.

2. Description of the Related Art

Modern processors frequently use branch prediction to improve the process of fetching instructions. By predicting the outcomes of branch instructions, processors can initiate the fetching of instructions that are dependent upon the outcomes of branch instructions before execution of those branch instructions completes. In this manner, processors can obtain higher instruction throughput.

To implement branch prediction, modern processors often include a dedicated branch prediction unit that is responsible for, among other things, predicting branch instruction outcomes. Branch prediction units typically use a variety of techniques to detect the direction of a branch (i.e., whether a branch is taken or not) and its target address (i.e., the address of the next instruction to be executed after a branch). As prediction techniques have become more advanced, branch prediction units have grown significantly in size and complexity. As a result, modern branch prediction units consume a significant amount of power and produce a significant amount of heat. The latency for predicting instructions has also increased.

SUMMARY

Various embodiments of structures and methods that allow a processor to replay a sequence of predicted instructions without a branch prediction unit re-predicting those instructions are disclosed herein.

In one embodiment, a processor is disclosed. The processor includes a branch prediction unit configured to predict a sequence of instructions to be issued by the processor for execution. The processor further includes a pattern detection unit configured to detect a pattern in the predicted sequence of instructions, where the pattern includes a plurality of instructions. In response to the pattern detection unit detecting the pattern, the processor is configured to switch from issuing instructions predicted by the branch prediction unit to issuing the plurality of instructions.

In another embodiment, a processor is disclosed. The processor includes a branch prediction unit configured to predict a sequence of instructions to be issued by the processor. The processor further includes a pattern detection unit configured to detect a pattern in the predicted sequence of instructions, where the pattern includes a plurality of predicted instructions. In response to the pattern detection unit detecting the pattern, the processor is configured to reduce power consumption of the branch prediction unit and to cause the plurality of predicted instructions to be issued.

In yet another embodiment, a method is disclosed. The method includes a processing element predicting a sequence of instructions to be issued by the processing element for execution. The method further includes the processing element detecting a pattern in the predicted sequence of instructions, where the pattern includes a plurality of instructions. The method further includes in response to detecting the pattern, the processing element switching from issuing instructions predicted by the branch prediction unit to issuing the plurality of instructions.

In still another embodiment, a computer readable storage medium is disclosed. The computer readable storage medium includes a data structure which is operated upon by a program executable on a computer system, the program operating on the data structure to perform a portion of a process to fabricate an integrated circuit including circuitry described by the data structure. The circuitry described in the data structure includes a pattern detection unit configured to detect a pattern in a sequence of instructions predicted by a branch prediction unit of the integrated circuit to be issued by the integrated circuit, where the pattern includes a plurality of instructions. In response to the pattern detection unit detecting the pattern, the integrated circuit is configured to switch from issuing instructions predicted by the branch prediction unit to issuing the plurality of instructions.

DETAILED DESCRIPTION

Figure 1:
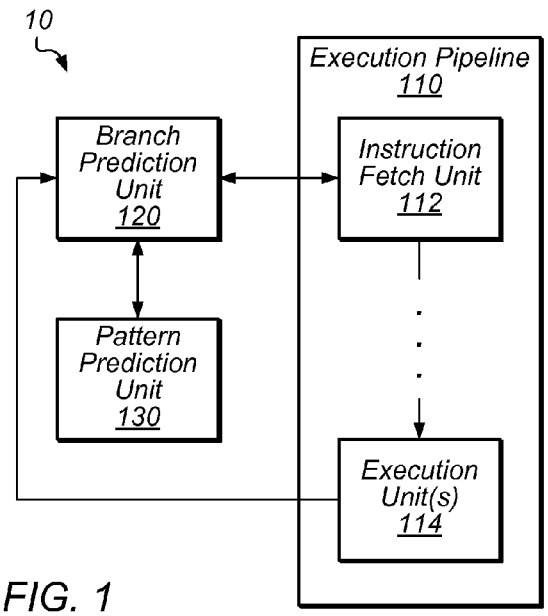
FIG. 1 is a block diagram illustrating one embodiment of a processor configured to replay a sequence of predicted instructions without a branch prediction unit re-predicting those instructions.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue.

"Branch Prediction Unit." This term has its ordinary and accepted meaning in the art, and includes logic that is configured to predict a sequence of instructions that are to be issued by a processor, including by predicting the outcomes of control transfer instructions (e.g., branches, call/return instructions, or other types of instructions that cause the transfer of execution from a current fetch address to a nonsequential address). In various embodiments, a branch prediction unit may be configured to predict directions, target addresses, return target addresses, indirect target addresses, etc. The predicted sequences of instructions may correspond to predicted fetch addresses (e.g., a branch prediction unit might predict four fetch addresses in one embodiment, each corresponding to a different cache line). Accordingly, references herein to prediction of sequences of instructions include prediction of fetch addresses. One predicted address could eventually result in the fetch, decode, and execution of zero to an implementation-dependent number of instructions.

"Predicted Instructions." As used herein, this term refers broadly to instructions that have been predicted (e.g., by a branch prediction unit) to be issued by a processor (as opposed to instructions that are scheduled to be issued as part of a current, non-predicted execution sequence).

"Branch Misprediction." This term has its ordinary and accepted meaning in the art, and includes a branch prediction unit incorrectly predicting the outcome of a control transfer instruction. In some instances, if a branch misprediction occurs, a processor may stop executing instructions along one path and initiate executing instructions along another path.

"Re-predicting." As used herein, this term refers to a branch prediction unit determining that the same sequence of predicted instructions is to be issued after previously determining that the sequence of predicted instructions is to be issued. For example, if a sequence of instructions includes a loop that includes instructions A, B, and C, a branch prediction unit may re-predict the issuance of instructions A, B, and C multiple times—e.g., for each iteration in the loop.

The present disclosure recognizes that branch prediction units frequently re-predict the same sequences of instructions, and that they use the same techniques for predicting instructions regardless of whether they are performing an initial prediction or a re-prediction. For example, if a thousand-iteration loop is being performed, prior embodiments of a branch prediction unit might predict the same sequence of instructions a thousand times—one for each iteration. For each prediction, such branch prediction units repeat various tasks, such as updating branch history information, re-predicting target addresses, etc. This disclosure recognizes that such activity consumes significant amounts of processor power.

The present disclosure describes techniques for detecting a pattern in a sequence of predicted instructions and repeatedly issuing instructions in the pattern without re-predicting those instructions. In one embodiment, a processor is disclosed that includes a pattern detection unit configured to detect a pattern in the predicted sequence of instructions and a replay unit configured to replay addresses of instructions in the pattern to cause those instructions to be reissued. In some embodiments, the processor may disable its branch prediction unit (in whole or in part) while the replay unit is replaying instructions. Because replaying of previously predicted instructions can typically be performed more efficiently than the branch prediction unit can re-predicting such instructions, the processor can, in some instances, significantly reduce the amount of power consumed to perform branch prediction.

In various embodiments, the processor does not begin using the replay unit until the processor can ensure that such usage will not decrease branch prediction accuracy or instruction throughput. Accordingly, the pattern detection unit, in one embodiment, is configured to detect patterns that indicate that inputs to the branch prediction unit are repeating and that values within one or more prediction structures in the branch prediction unit have stopped changing. In such a manner, if the branch prediction unit is disabled in whole or part, the prediction accuracy or instruction throughput is not affected. As a result, the processor may, in some instances, be able not only to reduce power consumption, but also to achieve such results without a loss of branch prediction accuracy.

Turning now to FIG. 1, a block diagram of processor 10 is depicted. Processor 10 is one embodiment of a processor that is configured to replay a sequence of predicted instructions. In the illustrated embodiment, processor 10 includes execution pipeline 110, branch prediction unit 120, and pattern detection unit 130. Execution pipeline 110 includes an instruction fetch unit 112 and one or more execution units 114. (In some embodiments, branch prediction unit 120 and pattern detection unit 130 may also be considered as being part of execution pipeline 110). In various embodiments, processor 10 may be configured differently than shown.

Processor 10 may represent any suitable processor. In one embodiment, processor 10 is a general-purpose processor such as a central processing unit (CPU). In some embodiments, processor 10 is a special-purpose processor such as an arithmetic processing unit (APU), digital signal processor (DSP), graphics processing unit (GPU), etc. In some embodiments, processor 10 is acceleration logic such as an application-specific integrated circuit (ASIC), a field-programmable gate array (FPGA), etc. In one embodiment, processor 10 is a multi-threaded superscalar processor. In one embodiment, processor 10 includes a plurality of multi-threaded execution cores (processing elements) that are configured to operate independently of one another.

Execution pipeline 110 is representative of circuitry that is configured to execute instructions (as used herein, the term "execute" broadly refers to performing various stages needed to initiate, perform, and commit an instruction). Execution pipeline 110 may, of course, include more units than shown in FIG. 1. For example, in one embodiment, execution pipeline 110 may include a decode unit configured to decode specified opcodes and operands of instructions. In one embodiment, execution pipeline 110 may include a rename unit configured to perform register renaming. In one embodiment, execution pipeline 110 may include an issue unit configured to provide instruction sources and data to execution units 114. In one embodiment, execution pipeline 110 may include a load store unit configured to facilitate performance of load/store instructions. In one embodiment, execution pipeline 110 may include a floating point unit configured to perform floating-point operations. In one embodiment, execution pipeline 110 may include a commit unit configured to manage retirement of instruction results. In short, execution pipeline 110 may include various suitable structures known in the art.

Instruction fetch unit (IFU) 112, in one embodiment, is configured to fetch instructions for execution in pipeline 110. In one embodiment, IFU 112 may be configured to select a thread for execution from among a plurality of threads and then fetch instructions for that thread. In one embodiment, IFU 112 is configured to fetch an instruction by generating a fetch address that is supplied to an instruction cache to cause retrieval of that instruction. As used herein, a "fetch address" specifies a memory location that stores an instruction to be fetched. In some embodiments, a fetch address may correspond to a single instruction to be fetched. In other embodiments, a fetch address may correspond to a set of instructions to be fetched—e.g., a fetch address corresponding to an entire cache line. In one embodiment, IFU 112 is configured to translate a fetch address from a virtual address to a corresponding physical address using an instruction table lookaside buffer (ITLB). In various embodiments, IFU 112 may generate a fetch address as a function of a program counter (PC), a predicted target address, or an address supplied in some other manner. As will be described below, in one embodiment, branch prediction unit 120 is configured to provide fetch addresses to IFU 112 to facilitate fetching instructions. In one embodiment, IFU 112 is configured to prefetch instructions before the instructions are actually required to be fetched. IFU 112 is described below further in conjunction with FIG. 3.

Execution units 114, in one embodiment, are configured to perform instructions fetched by IFU 112. In one embodiment, an execution unit 114 may be configured to perform (without limitation) arithmetic, logical, and/or shift instructions. For example, in one embodiment, execution units 114 may include one or more arithmetic logic units (ALUs) configured to calculate results of such instructions. In various embodiments execution units 114 may support integer instructions and/or floating-point instructions. In one embodiment, execution units 114 may be configured to perform load/store instructions. In various embodiments, execution units 114 may perform other instructions defined within the instruction set architecture (ISA) for processor 10.

In one embodiment, one or more execution units 114 are configured to perform control transfer instructions such as branches, call/return instructions, or other types of instructions that cause the transfer of execution from a current fetch address to a nonsequential address. In one embodiment, upon performing a control transfer instruction, an execution unit 114 is configured to provide an indication of its outcome to branch prediction unit 120. In various embodiments, branch prediction unit 120 is configured to use the provided indication to predict the outcomes of future control transfer instructions. In some embodiments, the provided indication may specify whether the outcome of a control transfer instruction has been mispredicted.

Branch prediction unit (BPU) 120, in one embodiment, is configured to determine a sequence of predicted instructions to be issued by processor 10. In one embodiment, BPU 120 specifies the sequence of predicted instructions to IFU 112 by providing fetch addresses to IFU 112 that are used to fetch corresponding instructions. In one embodiment, BPU 120 is configured to determine fetch addresses by predicting directions and target addresses of control transfer instructions. In some embodiments, BPU 120 is configured to predict instructions based on information received from IFU 112, such as a program counter. In some embodiments, IFU 112 is configured to identify whether the program counter is associated with a branch instruction, by partially decoding (or predecoding) a fetched instruction. In one embodiment, BPU 120 is configured to determine fetch addresses based on the outcomes of control transfer instructions previously performed by execution units 114. In various embodiments, BPU 120 may include structures to track prior branch history, maintain weight tables that reflect relative weights or strengths of predictions, and/or store predicted fetch addresses. BPU 120 is described below further in conjunction with FIG. 4.

Pattern detection unit (PDU) 130, in one embodiment, is configured to detect a pattern in a sequence of instructions predicted by BPU 120. In various embodiments, detection of a pattern by PDU 130 may include a determination that one or more state values (e.g., inputs or internal values of BPU 120 have stopped changing for a defined time period—for example, prediction structures 410-430 described below in conjunction with FIG. 4 have not changed for some number of loop iteration boundaries (e.g., two) or some number of clock cycles). Then, PDU 130 is further configured to cause processor 10 to repeatedly issue instructions in the pattern without using the prediction of BPU 120 as to what instructions are to be issued. Thus, if the detected pattern of instructions is "ABC," processor 10 may cause the issuance of "ABCAB-CABC, etc." without using the instructions that BPU 120 predicts to be issued (in other words, processor 10 may be causing instructions "ABC" to be issued two or more times regardless of whether instructions "DEF" are being predicted by BPU 120 or whether one or more prediction mechanisms of BPU 120 have been disabled in whole or part). In some instances, a detected pattern may include instructions that correspond to a loop, or to a set of nested loops. For example, BPU 120 may predict a sequence of instructions that corresponds to a loop, where each iteration of the loop includes executing instructions A, B, and C. In various embodiments, PDU 130 is configured to identify instructions A, B, and C as a pattern and to cause processor 10 to reissue instructions A, B, C, without using BPU 120 (or structures within BPU 120). In one embodiment, PDU 130 is configured to detect a pattern by identifying a pattern in a sequence of predicted fetch addresses. In some embodiments, PDU 130 may detect a pattern based, at least in part, on branch history information or other types of information. In some embodiments, to ensure BPU 120 is predicting the same sequence of instructions, PDU 130 may not indicate that a pattern has been detected until a sequence of instructions has been predicted multiple times. For example, in one embodiment, PDU 130 may not indicate that a pattern has been detected until a branch target buffer (BTB) has predicted the same sequence of target addresses for two loop iterations. Similarly, in one embodiment, PDU 130 may not indicate that a pattern has been detected until a sequence of directions has been predicted for, e.g., thirty iterations. In one embodiment, PDU 130 includes a buffer configured to store information, collected from BPU 120 about previously predicted instructions. In one embodiment, PDU 130 causes instructions to be repeatedly issued by instructing BPU 120 to replay fetch addresses of instructions in the detected pattern to IFU 112 without re-predicting those instructions. In another embodiment, PDU 130 provides fetch addresses to a separate replay unit (described in FIG. 2) that is configured to replay those addresses to IFU 112. In one embodiment, PDU 130 is configured to cause processor 10 to reissue instructions until a misprediction is detected. In one embodiment, once a pattern is detected, PDU 130 is configured to cause BPU 120 to stop predicting instructions. In some embodiments, PDU 130 is configured to stop instruction prediction by disabling BPU 120 (or causing BPU 120 to disable one or more structures within BPU 120). As used herein, the term "disable" broadly refers to causing a unit/ structure to discontinue operation for a period of time. PDU 130 is described below further in conjunction with FIG. 5.

By detecting a pattern in a sequence of predicted instructions (which may, in some embodiments, indicate that inputs to BPU 120 are repeating and that values within key prediction structures have stopped changing), processor 10 can replay predicted instructions without using the instructions predicted to be issued by BPU 120 or without needing to re-predict those instructions using BPU 120. As a result, processor 10 can disable BPU 120 (or structures within BPU 120) while replaying instructions. In this manner, processor 10 can be more efficient by consuming less power. Another potential benefit of replaying branch predictions (rather than performing entire predictions) is that the latency to complete a branch can be reduced.

Figure 2:
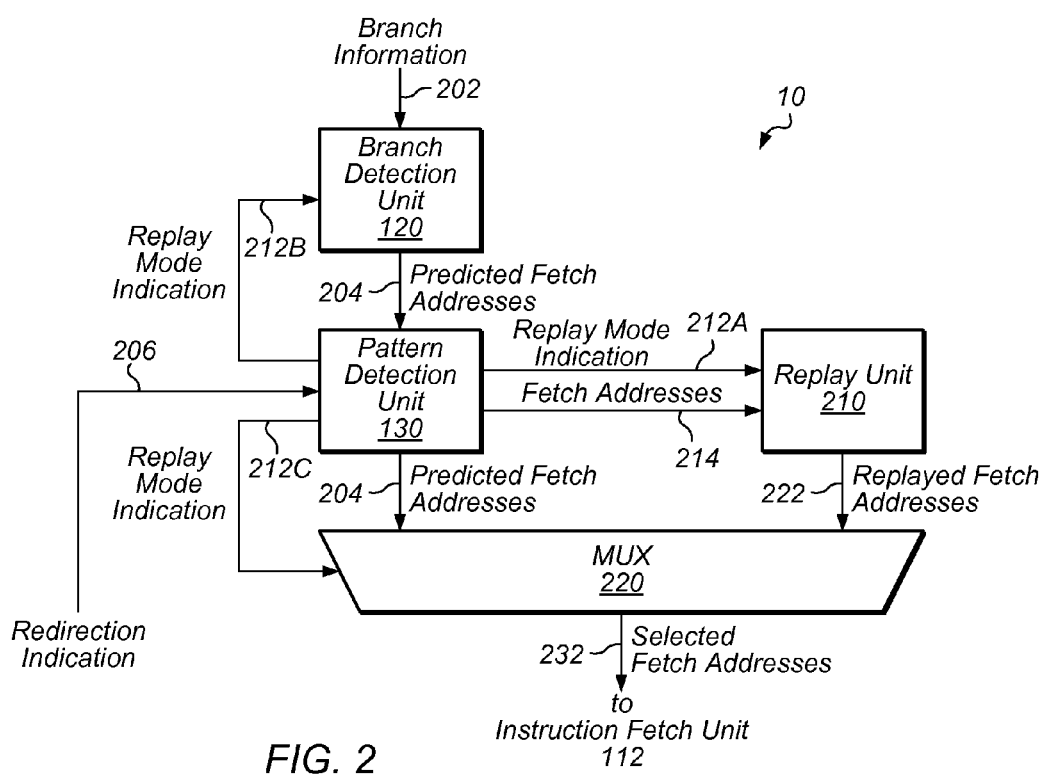
FIG. 2 is a block diagram illustrating one embodiment of a processor that includes a replay unit.

Turning now to FIG. 2, one embodiment of processor 10 that includes replay unit 210 is depicted. In the illustrated embodiment, IFU 112 is configured to fetch instructions predicted by BPU 120 until PDU 130 identifies a pattern in the predicted instructions. Once a pattern is detected, PDU 130, in one embodiment, indicates that processor 10 is to enter a replay mode in which replay unit 210 replays fetch addresses of instructions identified in the pattern to IFU 112 to cause those instructions to be repeatedly issued (i.e., two or more times) by processor 10. In one embodiment, replay unit 210 continues to replay the fetch addresses until a branch misprediction is detected and PDU 130 indicates that processor 10 is to exit replay mode. In some embodiments, various structures of BPU 120 may be disabled during replay mode. In the illustrated embodiment, processor 10 includes BPU 120, PDU 130, replay unit 210, and multiplexer (MUX) 220. (In some embodiments, various structures shown logically in FIG. 2 may be considered as part of, e.g., BPU 120 or PDU 130.)

In one embodiment, BPU 120 is configured to predict instructions that are to be issued by processor 10 based on received branch information 202. In one embodiment, branch information 202 includes one or more results of previously executed control transfer instructions. In some embodiments, such results may include, for a particular control transfer instruction (e.g., an instruction at some particular address), an indication of that control transfer instruction's type (e.g., direct branch indirect branch, jump, etc.), the direction (e.g., taken or not taken), the last calculated target address, etc. In one embodiment, BPU 120 is configured to receive results of executed control transfer instructions from execution units 114. In other embodiments, BPU 120 is configured to receive results of executed control transfer instructions from other sources, such as a commit unit of processor 10. In one embodiment, branch information 202 includes a program counter that identifies the current instruction (or instructions) being fetched by IFU 112 for which a prediction is to be made. In some embodiments, branch information 202 may also include an indication whether the program counter corresponds to an address of a control transfer instruction or non-control transfer instruction.

In the illustrated embodiment, BPU 120 provides fetch addresses 204 of predicted instructions to PDU 130. In one embodiment, predicted fetch addresses 204 include predicted target addresses of control transfer instructions. In some embodiments, predicted fetch addresses 204 also include predicted addresses of non-control transfer instructions such as sequential addresses. (As used herein, a sequential address is an address of an instruction that comes next in program order. For example, a target address may specify an instruction that is followed by one or more additional instructions. The addresses of the one or more additional instructions may be referred to as sequential addresses). In some embodiments, BPU 120 may also provide other prediction information to PDU 130, such as branch history information. In one embodiment, BPU 120 is configured to provide global history information that identifies the outcomes for a set of previously executed control transfer instructions—e.g., the outcomes of the last five executed branch instructions. In some embodiments, BPU 120 is configured to provide one or more local branch history information—e.g., the last five outcomes of a particular executed branch instruction. In one embodiment, BPU 120 is configured to provide information generated by a loop iteration predictor that specifies when a loop in a sequence of predicted instructions is to be exited.

In one embodiment, PDU 130 is configured to detect a pattern in sequence of predicted instructions by detecting one or more patterns in information provided by BPU 120. In one embodiment, PDU 130 is configured to detect a pattern in a sequence of predicted instructions by detecting a pattern in a sequence of predicted fetch addresses 204. In one embodiment, PDU 130 is configured to detect a pattern in a sequence of predicted instructions by detecting a pattern in received global history information. In one embodiment, PDU 130 is configured to detect a pattern in a sequence of predicted instructions by detecting pattern in one or more local branch histories of one or more control transfer instructions. In one embodiment, PDU 130 is configured to detect a pattern in a sequence of predicted instructions based on information received by loop iteration predictor (such as described in FIG. 4). In various embodiments, PDU 130 is configured to detect a pattern in a sequence of predicted instructions by detecting combinations of patterns. For example, in one embodiment, PDU 130 is configured to detect a pattern in sequence of predicted instructions by detecting a pattern in a set of target addresses and a pattern in the global branch history.

In one embodiment, PDU 130 is configured to cause processor 10 to enter a "replay mode" upon detecting a pattern, where during replay mode, replay unit 210 replays fetch addresses of instructions in the pattern. As noted above, in various embodiments, PDU 130 may cause processor 10 to enter replay mode only if PDU 130 detects a pattern, which indicates that one or more of a set of inputs to BPU 120 are repeating and that values within key prediction structures have stopped changing for some period of time (e.g., some number of loop iterations, some number of clock cycles, etc.). In such situations, replaying instructions (i.e., repeatedly issuing instructions in the detected pattern) may not reduce prediction accuracy and instruction throughput. In the illustrated embodiment, PDU 130 is configured to indicate whether processor 10 is to operate in replay mode by providing replay mode indications 212A-C respectively to PDU 130, BPU 120, and MUX 220. In one embodiment, PDU 130 is configured to cause processor 10 to exit replay mode in response to receiving redirection indication 206 specifying that a branch misprediction has occurred. In one embodiment, PDU 130 receives redirection indication 206 from an execution unit 114 after that unit performs a control transfer instruction that was mispredicted. In another embodiment, PDU 130 receives redirection indication 206 from a commit unit of processor 10. In other embodiments, PDU 130 receives redirection indication 206 from other structures of processor 10.

In one embodiment, PDU 130 is configured to provide replay mode indication 212A and fetch addresses 214 of instructions in the detected pattern to replay unit 210 to cause replay unit 210 to replay fetch addresses 214 to IFU 112. In some embodiments, fetch addresses 214 may include predicted target addresses and/or predicted sequential addresses. In one embodiment, replay unit 210 is configured to replay fetch addresses until PDU 130 receives redirection indication 206 and indication 212A specifies that processor 10 is exiting replay mode. In the illustrated embodiment, replay unit 210 is configured to provide replayed fetch addresses 222 to MUX 220 described below. In other embodiments, replay unit 210 may provide address 222 differently than shown in FIG. 2, e.g., directly to IFU 112.

In one embodiment, PDU 130 is configured to provide replay mode indication 212B to BPU 120 to cause BPU 120 to stop predicting instructions while processor 10 is operating in replay mode. In one embodiment, BPU 120 is configured to disable one or more structures while not predicting instructions. For example, in various embodiments, BPU 130 may be configured to disable one or more target-address prediction tables, a type detection unit, and/or loop iteration predictor responsive to indication 212B specifying that processor 10 is operating in replay mode. In one embodiment, BPU 120 is configured to initiate re-predicting instructions in response to pattern detection unit 130 receiving redirection indication 206 and indication 212B specifying processor 10 is exiting replay mode.

In the illustrated embodiment, MUX 220 receives predicted fetch addresses 204 from PDU 130 and replayed fetch addresses 222 from replay unit 210. (In some embodiments, MUX 220 may receive predicted fetch addresses 204 directly from BPU 120). In one embodiment, MUX 220 is configured to select between fetch addresses 204 and 222 based on replay mode indication 212C and to provide selected fetch addresses 232 to IFU 112. In one embodiment, if indication 212C specifies that processor 10 is not operating in replay mode, MUX 220 is configured to select predicted fetch addresses 204 and to provide addresses 204 to IFU 112. On the other hand, if indication 212C specifies that processor 10 is operating in replay mode, MUX 220, in one embodiment, is configured to select between replayed fetch addresses 222 and to provide addresses 222 to IFU 112. IFU 112 may then fetch the selected instructions. Note that in various embodiments, a multiplexer such as MUX 220 may not be present, but rather may be implemented using equivalent structures known to those of skill in the art.

Figure 3:
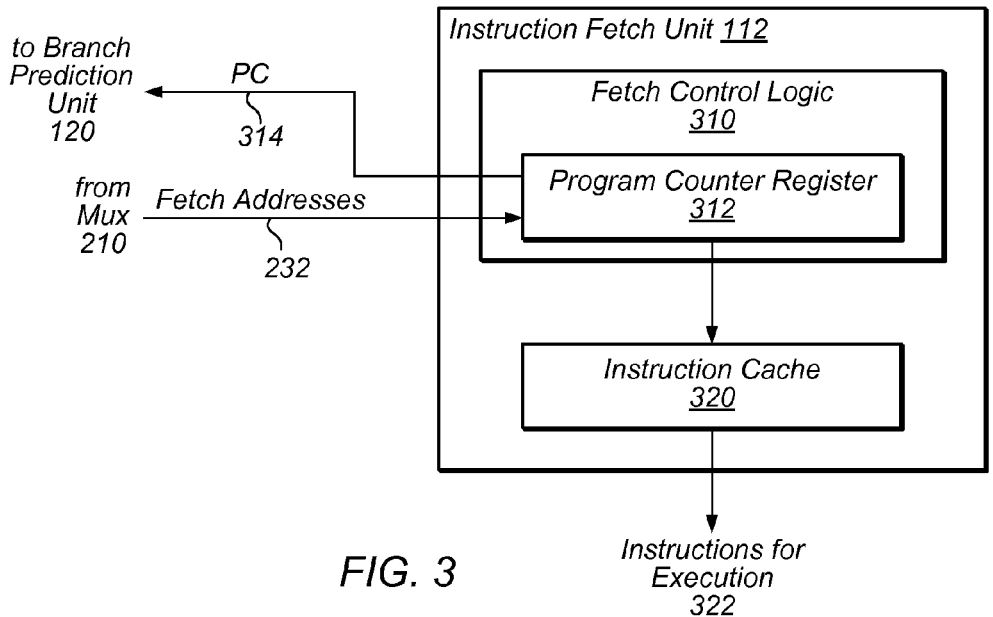
FIG. 3 is a block diagram illustrating one embodiment of an instruction fetch unit.

Turning now to FIG. 3, a block diagram of IFU 112 is depicted. As discussed above, IFU 112 is one embodiment of an instruction fetch unit that is configured to fetch instructions, including predicted instructions. In the illustrated embodiment, IFU 112 includes fetch control logic 310 and instruction cache 320. In various embodiments, IFU 112 may include additional structures, such as an instruction translation lookaside buffer (ITLB), instruction buffers, structures configured to store state that is relevant to thread selection and processing, etc. In some embodiments, instruction cache 320 may not be considered as part of IFU 112.

Fetch control logic 310, in one embodiment, is circuitry/logic that is configured to facilitate the fetching of instructions by IFU 112. In one embodiment, logic 310 includes a program counter register 312 that is configured to maintain a program counter (PC) 314 that is used to identify an instruction (or a set of instructions) that are to be fetched. In the illustrated embodiment, logic 310 is configured to provide program counter (PC) 314 to BPU 120 to facilitate the prediction of instructions. In one embodiment, logic 310 is then configured to adjust the program counter based on fetch addresses 232. For example, in some embodiments, logic 310 may be configured to store a received fetch address 232 in register 312 as the next PC 314. In other embodiments, fetch addresses 232 may specify a portion of a total fetch address or an offset that is used to adjust PC 314. For example, in one embodiment, logic 310 may increment PC 314 based on a received fetch address 232. In various embodiments, logic 310 is configured to provide adjusted PC 314 to instruction cache 320 to initiate fetching of instruction(s).

Instruction cache 320, in one embodiment, is configured to store instructions that are to be issued by processor 10. In one embodiment, upon receiving a PC, instruction cache 320 is configured to determine whether the PC hits or misses—i.e., whether it includes any instructions corresponding to the received PC. In one embodiment, if PC hits in cache 320, cache 320 provides the instruction 322 (or cache line) to subsequent stages of execution pipeline 310 (e.g., a decode unit) to begin executing that instruction or instructions. In some embodiments, if the PC misses in cache 320, cache 320 is configured to provide a corresponding request to higher-level caches, memory management unit, or portion of the memory hierarchy (e.g., random access memory or RAM).

Figure 4:
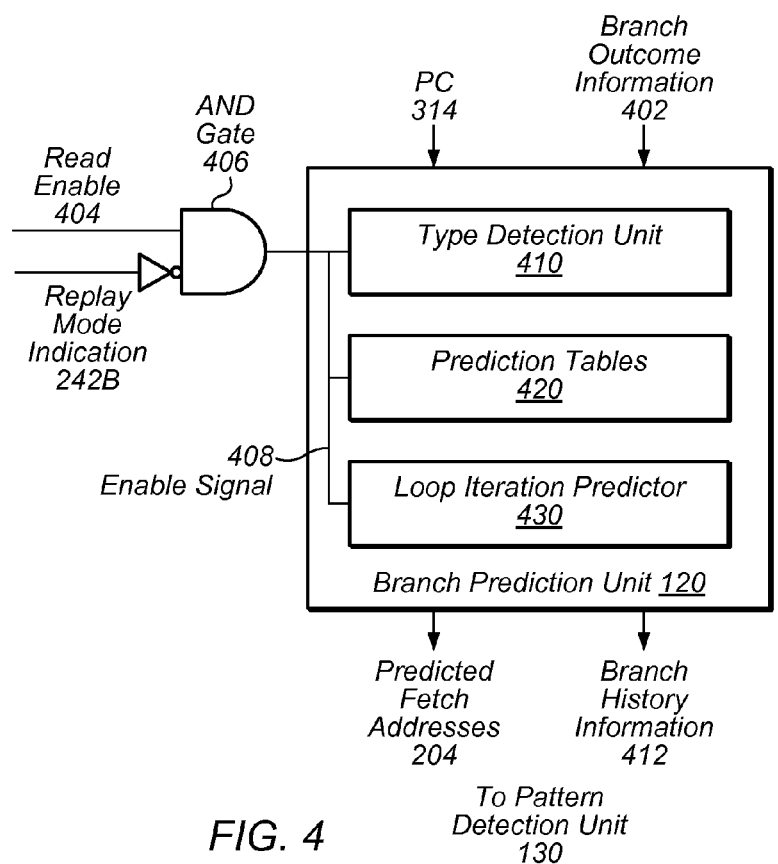
FIG. 4 is a block diagram illustrating one embodiment of a branch prediction unit.

Turning now to FIG. 4, a block diagram of BPU 120 is depicted. As discussed above, BPU 120 is one embodiment of a branch prediction unit that is configured to determine a sequence of instructions predicted to be issued by processor 10 by predicting outcomes of control transfer instructions. As will be described below, in one embodiment, processor 10 (e.g., using PDU 130) is configured to decrease power consumption of BPU 120 while processor 10 is operating in replay mode. In some embodiments, processor 10 may decrease power consumption by disabling one or more of structures in BPU 120. In the illustrated embodiment, BPU 120 includes type detection unit 410, prediction tables 420, and loop iteration predictor 430. In some embodiments, BPU 120 may include more (or less) structures/units than shown.

In the illustrated embodiment, BPU 120 is configured to receive PC 314 and branch outcome information 402. As discussed above, in one embodiment, BPU 120 may receive PC 314 from IFU 112. In one embodiment, BPU 120 is configured to receive branch outcome information 402 from one or more execution units 314. In some embodiments, BPU 120 is configured to receive branch outcome information 402 from other units in processor 10 such as a commit unit. In one embodiment, branch outcome information 402 includes the directions taken by previously executed control transfer instructions. In one embodiment, branch outcome information 402 includes target addresses (including return target addresses, indirect target addresses, etc.) calculated for previously executed control transfer instructions. In some embodiments, branch outcome information 402 may include other information such as indications of the types of control transfer instructions that were executed. In some embodiments, BPU 120 is configured to provide PC 314 and branch outcome information 402 to various ones of units 410-430 in order to facilitate prediction of instructions to be issued for execution.

In the illustrated embodiment, BPU 120 is configured to provide predicted fetch addresses 204 and branch history information 412 to PDU 130. In one embodiment, predicted fetch addresses 204 includes target addresses of control transfer instructions. In some embodiments, predicted fetch addresses 204 may also include sequential addresses. In one embodiment, branch history information 412 includes a global branch history that identifies the outcomes for a set of previously executed control transfer instructions. In some embodiments, branch history information 412 includes one or more local branch histories. In one embodiment, branch history information 412 includes information that identifies a loop in a sequence of instructions and predicts whether the loop is to be exited. In various embodiments, BPU 120 is configured to generate fetch address 204 and branch history information 412 using units 410-430.

Type detection unit 410, in one embodiment, is configured to determine types of control transfer instructions being issued by processor 10, such as whether a particular instruction is a jump, direct branch, indirect branch, call/return instruction, etc. In one embodiment, type detection unit 410 is configured to determine a type of a control transfer instruction based on PC 314. For example, PC 314 may specify an address of a previously executed instruction that was determined to be an indirect branch. In some embodiments, type detection unit 410 is configured to store information mapping addresses to determined instruction types. In one embodiment, type detection unit 410 is configured to determine the type of a control transfer instruction from an opcode, e.g., provided by IFU 112. In other embodiments, type detection unit 410 may use other techniques to determine the types of control instructions. In various embodiments, type detection unit 410 is configured to indicate the determined types of control transfer instructions to various ones of tables 420 and/or loop iteration predictor 430.

Prediction tables 420, in one embodiment, are configured to predict outcomes of control transfer instructions. In one embodiment, prediction tables 420 include a table that is configured to predict directions of control transfer instructions. In one embodiment, prediction tables 420 include one or more tables configured to predict target addresses of control transfer instructions, such as direct target addresses, indirect target addresses, return target addresses, etc. In some embodiments, prediction tables 420 may include other types of prediction tables. In various embodiments, one or more tables 420 are configured to track history information using strength counters. As used herein, a strength counter is a register that stores a value that is incremented or decremented based on outcomes of a previously executed control transfer instruction. For example, in one embodiment, a two-bit strength counter may be employed to predict a direction of a particular branch instruction. If the branch instruction was taken was taken twice, its strength counter may be incremented twice indicating a high likelihood that the branch may be taken again. If, however, the branch instruction was not taken and then not taken again, its strength counter may be decremented twice indicating a high likelihood that the branch instruction may not be taken again. Thus, if the counter is incremented twice and BPU 120 encounters a subsequent instance of the branch instruction, BPU 120, in one embodiment, may predict the outcome of that instruction as being taken. In some embodiments, strength counters may also be used to determine target addresses or other types of information.

Loop iteration predictor 430, in one embodiment, is configured to identify a loop in a sequence of instructions and to predict a number of iterations to be performed until the loop is exited. In one embodiment, loop iteration predictor 430 predicts the number of iterations in a loop based on an initial performance of that loop. For example, in some embodiments, loop iteration predictor 430 may increment a counter for each iteration of the loop. If the loop is subsequently performed, loop iteration predictor 430, in one embodiment, may predict when it is to be exited based on the incremented counter. In other embodiments, loop iteration predictor 430 may predict a number of iterations using different techniques.

In one embodiment, processor 10 is configured to decrease power consumption of BPU 120 while processor 10 is operating in replay mode by disabling one or more of units 410-430 (or structures within those units), or other units within BPU 120. In one embodiment, processor 10 enables and disables units 410-430 by generating an enable signal 408 that is set to a logical one to enable instruction prediction and set to a logical zero to disable instruction prediction. In the illustrated embodiment, AND gate 406 is configured to generate enable signal 408 from the logical AND of read enable 404 and the inversion of replay mode indication 212B. In one embodiment, read enable 404 is raised to a logical one (i.e., set) to cause BPU 120 to initiate a prediction of a fetch address for a given PC 314. In one embodiment, replay mode indication 212B is a logical one if processor 10 is operating in replay mode and a logical zero otherwise. The truth table below illustrates one embodiment of the possible outputs of AND gate 406.

TABLE 1

Generating Enable Signal 408:

| Indication 212B | Inverted Indication 212B | Read Enable 404 | Enable Signal 408 |
|---|---|---|---|
| Set | Not Set | Set | Not Set |
| Set | Not Set | Not Set | Not Set |
| Not Set | Set | Set | Set |
| Not Set | Set | Not Set | Not set |

Note that if replay mode indication 212B is set (i.e., a logical one) indicating that processor 10 is operating in replay mode, enable signal 408 remains at a logical zero—thus causing BPU 120 to not predict fetch addresses. If, however, replay mode indication 212B is not set indicating that processor 10 is not operating in replay mode, disable signal 408, in one embodiment, becomes a logical one if read indication 404 is raised to a logical one—thus causing BPU 120 to predict instructions.

It is noted that processor 10 may generate enable signal 408 differently or use other techniques for disabling unit 410-430 in other embodiments. In some embodiments, processor 10 may not disable all of units 410-430. In various embodiments, processor 10 may disable specific structures within one of units 410-430 without disable all structures in that unit—e.g., specific tables 420, but not all tables 420.

Figure 5:
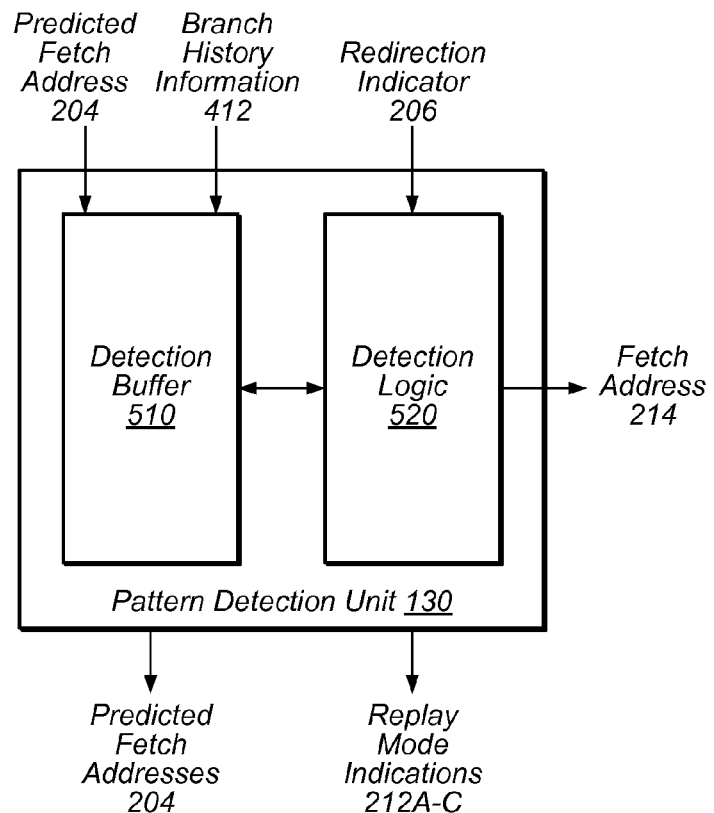
FIG. 5 is a block diagram illustrating one embodiment of a pattern detection unit.

Turning now to FIG. 5, a block diagram of PDU 130 is depicted. As discussed above, PDU 130 is one embodiment of a unit that is configured to detect a pattern in instructions predicted to be issued by processor 10 and to cause processor 10 to switch from issuing instructions predicted by BPU 120 to issuing instructions in the pattern detected by PDU 130. In some embodiments, portions of BPU 120 may not be operable for a period of cycles, while in other embodiments, BPU 120 may continue to predict instructions but the predicted instructions are not selected for issuance (i.e., they are ignored or discarded). As also disclosed above, in various embodiments, PDU 130 may not cause processor 10 to switch from issuing predicted instructions to issuing instructions in the detected pattern unless PDU 130 can ensure that such usage will not decrease branch prediction accuracy or instruction throughput. In the illustrated embodiment, PDU 130 includes a detection buffer 510 and detection logic 520.

Detection buffer 510, in one embodiment, is configured to store predicted fetch addresses 204 and branch history information 412, which are analyzed by detection logic 520 to find patterns in predicted instructions. In one embodiment, detection buffer 510 includes a predetermined number of entries that are each configured to store an address 204 and information 412 for a given predicted instruction. For example, buffer 510 may include N entries configured to store information associated with the last N instructions predicted by BPU 120. As new addresses 204 and information 414 is received, detection buffer 510, in one embodiment, is configured to evict addresses 204 and information 414. In one embodiment, detection buffer 510 is configured to provide predicted fetch addresses 204 to MUX 220 when those addresses 204 are being evicted. For example, buffer 510 may provide a particular address 204 to MUX 220 when that address becomes the oldest one stored in buffer 510. In another embodiment, detection buffer 510 is configured to provide fetch address 204 as they are received and is further configured to continue storing those addresses 204 and information 414 for some period afterwards—e.g., the next N predicted instructions. Detection buffer 510 is described below further in conjunction with FIG. 6.

Detection logic 520, in one embodiment, is configured to detect a pattern in instructions predicted by BPU 120, by detecting patterns in predicted fetch addresses 204 and branch history information 412 stored in detection buffer 510. In various embodiments, logic 520 is configured to detect patterns in addresses 204 and information 412 by comparing entries in detection buffer 510. For example, a set of entries in buffer 510 may include the sequence of fetch addresses A, B, C, A, B, C, etc. In one embodiment, logic 520 may compare the entry storing fetch address A with other entries in buffer 510. Upon determining that A reoccurs every three entries, logic 520 may conclude that a potential pattern exists. Logic 520 may then compare additional ones of the entries. In one embodiment, logic 520 may conclude that a pattern exists once the number of identified matches exceeds some predetermined threshold—e.g., a set of three fetch addresses reoccur two or more times. In some embodiments, logic 520 may also compare branch history information associated with matching fetch addresses. For example, fetch addresses A, B, C, A, B, C may correspond to branch instructions that have global history taken, not taken, taken, taken, not taken, taken. In one embodiment, logic 520 may not conclude that it has detected a pattern until it has detected that there is a pattern in the global history corresponding to the matching fetch addresses. For example, if the global history is taken, not taken, taken, taken, taken, taken, logic 520, in one embodiment, may conclude that a pattern of predicted instructions does not exist even though there is a pattern of predicted fetch addresses. In various embodiments, logic 520 may compare other types of information, such as local history information of one or more control transfer instructions, the addresses of control transfer instructions, whose results are being predicted by BPU 120, etc.

In the illustrated embodiment, detection logic 520 is configured to provide replay mode indications 212A-C. In one embodiment, logic 520 is configured to cause processor 10 to enter replay mode in response to detecting a pattern in instructions predicted by BPU 120. In one embodiment, logic 520 is configured to cause processor 10 to exit replay mode in response to receiving redirection indication 206. In some embodiments, logic 520 is configured to cause processor 10 to exit replay mode in response to receiving an indication from loop iteration predictor 430 specifying when an identified loop is to be exited.

In the illustrated embodiment, detection logic 520 is configured to provide fetch addresses 214 of instructions in the detected pattern to replay unit 210. In one embodiment, logic 520 is configured to provide fetch addresses 214 to replay unit 210 without any modification—i.e., as predicted by BPU 120 in the ordering predicted by BPU 120. In another embodiment, logic 520 is configured to optimize fetch addresses 214 before providing them to replay unit 210. As noted above, in some embodiments, a single fetch address can be used to fetch a block of instructions, such as an entire cache line. In some instances, if BPU 120 predicts that different instructions from the same block are to be fetched, BPU 120 may provide multiple fetch addresses that map to the same block (e.g., cache line). As a result, IFU 112 may unnecessarily fetch the same block multiple times—e.g., once for each predicted instruction. In one embodiment, logic 520 is configured to detect that fetch addresses 204 includes fetch addresses that map to same block and to remove the redundant fetch addresses. In some embodiments, logic may optimize the fetch addresses 204 provided to MUX 220 in a similar manner.

Figure 6:
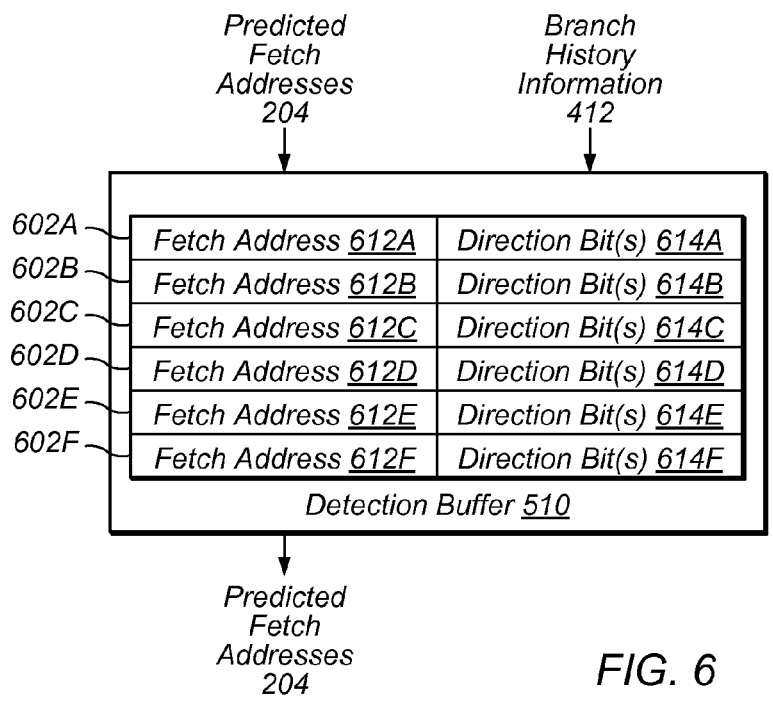
FIG. 6 is a block diagram illustrating one embodiment of a detection buffer in a pattern detection unit.

Turning now to FIG. 6, a block diagram of one embodiment of a detection buffer 510 is depicted. In the illustrated embodiment, detection buffer 510 includes entries 610A-F that are configured to store fetch addresses 612A-F and corresponding direction bits(s) 614A-F.

Fetch Addresses 612A-F, in one embodiment, are the last N fetch addresses predicted by BPU 120. As discussed above, in one embodiment, fetch addresses 612A-F include predicted target addresses of control transfer instructions. In some embodiments, fetch addresses 612A-F may also include sequential fetch addresses.

Direction bit(s) 614A-F, in one embodiment, indicate branch history information associated with fetch addresses 612A-F. For example, if fetch address 612A is a target address of a particular branch instruction, direction bits 614A, in one embodiment, specify the local history of that branch. In some embodiments, detection logic 520 is configured to determine global history information from multiple ones of bits 614. For example, in one embodiment, logic 520 may examine the first bit in each one of direction bits 614A-F to identify the global history. In some embodiments, if an entry 610 includes a fetch address 612 of sequential instructions, the direction bits 614 of that entry 610, in one embodiment, may bit set to some predetermined value (e.g., all zeros).

In some embodiments, entries 610 may include additional information associated with predicted instructions. In one embodiment, entries 610 may include a field that stores an address of the instruction that produces a fetch address. For example, if fetch address 612A is a target address of a particular control transfer instruction, entry 610 may also include the address (or indication thereof) of that particular control transfer instruction. In some embodiments, detection logic 520 may compare such addresses to identify a pattern in predicted instructions.

In one embodiment, detection logic 520 is configured to retrieve information from entries 610 and to compare the retrieved information in order to detect a pattern in predicted instructions. If logic 520 detects a pattern, logic 520, in one embodiment, may then provide the fetch addresses 612 associated with the pattern to replay unit 210. For example, if entries 610A-C store information corresponding to instructions A, B, and C and this information is repeated in entries 610D-F, logic 520 may provide fetch address 612A-C to replay unit 210 and cause processor 10 to enter replay mode.

Figure 7:
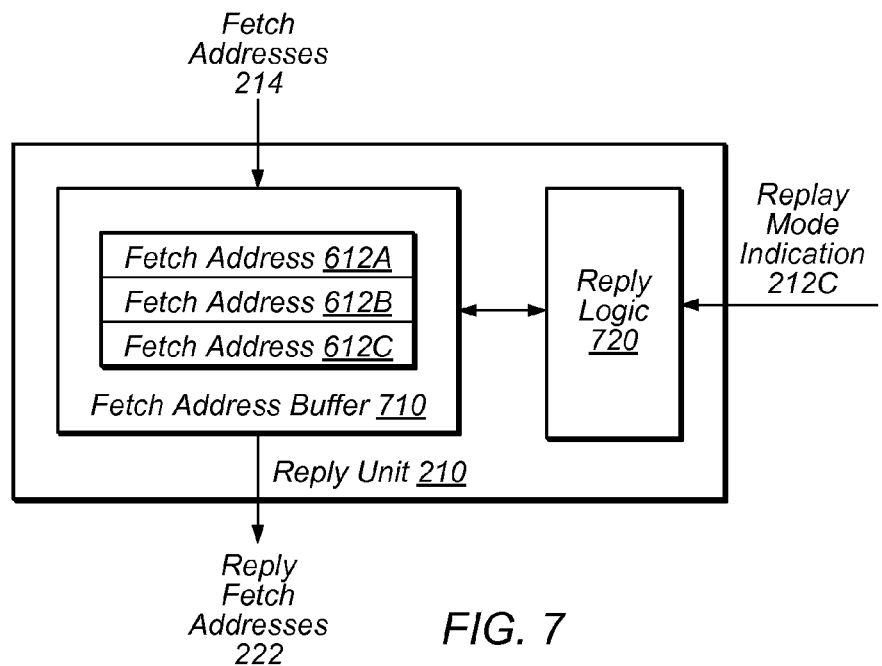
FIG. 7 is a block diagram illustrating one embodiment of a replay unit.

Turning now to FIG. 7, a block diagram of a replay unit 220 is depicted. As discussed above, replay unit 220 is one embodiment of a unit that is configured to store fetch addresses of predicted instructions in a pattern detected by PDU 130. In the illustrated embodiment, replay unit 210 includes fetch address buffer 710 and replay logic 720.

Fetch address buffer 710, in the illustrated embodiment, is configured to store received fetch addresses 214. For example, buffer 710 may include fetch addresses 612A-C corresponding to the pattern described above with reference to FIG. 6 and other figures. As discussed, in one embodiment, fetch addresses 612A-C may include predicted target addresses. In some embodiments, fetch addresses 612A-C may also include sequential addresses. In some embodiments, fetch address buffer 710 may store only portions of fetch addresses 612A-C. In one embodiment, fetch addresses 612A-C may be an optimized version of the fetch addresses 612A-612C were initially predicted by BPU 120 (e.g., suppressing multiple fetch addresses within the same cache line).

Replay logic 720, in one embodiment, is configured to coordinate replaying of instructions 612A-C from buffer 710. In one embodiment, replay logic 720 is configured to initiate replaying fetch addresses 612A-C in response to replay mode indication 212A specifying that processor 10 is entering in replay mode. In one embodiment, replay logic 720 is configured to continue replaying fetch addresses 612A-C until replay mode indication 212A specifies that processor 10 is exiting replay mode. In one embodiment, replay logic 720 is configured to select when a particular fetch address 612 is to be replayed. In one embodiment, replay logic 720 is configured to select a particular fetch address 612 based on a received program counter (e.g., PC 314). For example, in some embodiments, fetch address buffer 720 may be configured as a lookup table that is configured to output a fetch address in response to receiving an input of a program counter. In another embodiment, replay logic 720 is configured to store an indication of the last replayed instruction 222, where logic 720 uses the indication to select the next instruction to be replayed. For example, in some embodiments, logic 720 may increment a counter that is used to select fetch addresses 612. In other embodiments, logic 720 may use other techniques to select fetch addresses 612 that are to be replayed.

Figure 8:
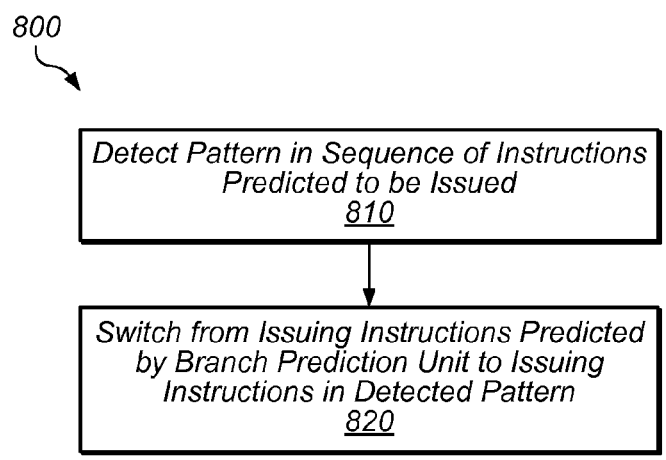
FIG. 8 is a flow diagram illustrating one embodiment of a method for replaying a sequence of predicted instructions.

Turning now to FIG. 8, a flow diagram of a method 800 performed by processor 10 is depicted. Method 800 is one embodiment of a method for replaying a sequence of predicted instructions. In some instances, performing method 800 can reduce power consumption of processor 10 by reducing the activity (and thus power consumption) of BPU 120.

In step 810, processor 10 (e.g. using pattern detection unit 130) detects a pattern in a sequence of instructions predicted to be issue by processor 10. As discussed above, processor 10 may use any of a variety of techniques to detect the pattern. In one embodiment, processor 10 detects the pattern by detecting a pattern in a sequence of target addresses predicted by a branch prediction unit (e.g., BPU 120). In some embodiments, processor 10 detects the pattern by identifying a pattern in a sequence of target addresses and sequential addresses predicted by the branch prediction unit. In one embodiment, processor 10 detects the pattern by identifying a pattern in global history information maintained by the branch prediction unit, where the global history information includes a sequence of directions previously taken by control transfer instructions. In one embodiment, processor 10 detects the pattern by detecting a pattern in local history information, where the local history information includes a sequence of directions previously taken by a given control transfer instruction. In some embodiments, processor 10 detects the pattern by detecting a combination of patterns— e.g., both a pattern in a sequence of predicted target addresses and a pattern in global history information associated with the sequence of predicted target addresses. As noted above, in some embodiments, patterns may be detected (or valid) only if certain values that are inputs to BPU 120 or internal to BPU 120 have not changed for some specified period of times (e.g., waiting for BPU 120 inputs/values to be the same at a loop iteration boundary for two consecutive iterations), which means that the output of BPU 120 is not currently changing.

In step 820, processor 10 switches from issuing instructions predicted by the branch prediction unit to issuing instructions in the detected pattern. In one embodiment, a pattern detection unit of processor 10 causes the instructions to repeatedly issue by causing processor 10 to enter a replay mode. In one embodiment, while processor 10 is operating in replay mode, a replay unit of processor 10 (e.g., replay unit 210) replays (provides) a sequence of addresses of the instructions included in the pattern to an instruction fetch unit (e.g., IFU 112), which in turn causes the instructions to be fetched and then provided to the pipeline for execution (i.e., to be reissued by the processor). In one embodiment, the replayed addresses include target addresses predicted by the branch prediction unit. In some embodiments, the replayed addresses include sequential addresses predicted by the branch prediction unit. In one embodiment, processor 10 remains in replay mode repeatedly issuing the instructions until the pattern detection unit receives a redirection indication (e.g., indication 206) specifying a misprediction has occurred. In some embodiments, processor 10 may remain in replay mode repeatedly issuing the instructions until the pattern detection unit determines that a misprediction is likely to occur based on received information from a loop iteration predictor (e.g., predictor 430). In one embodiment, upon exiting replay mode, processor 10 initiates re-predicting instructions (i.e., circuitry in the branch prediction unit becomes active again).

In various embodiments, processor 10 may reduce power consumption of BPU 120 while processor 10 is operating in replay mode. In one embodiment, processor 10 is configured to reduce the power consumption by disabling a type detection unit (e.g., type detection unit 410) configured to determine the types of control transfer instructions being issued by the processor. In one embodiment, processor 10 reduces the power consumption by disabling one or more target-address prediction tables (e.g., predictions tables 420). In one embodiment, processor 10 is configured to reduce the power consumption by disabling a loop iteration predictor (e.g., predictor 430) configured to predict a number of iterations to be performed in a loop. Any whole or partial deactivation of one or more structures (including some or all of a branch prediction unit) within a processor performed responsive to a pattern detected in a sequence of predicted instructions is contemplated by the present disclosure.

Exemplary Computer System

Figure 9:
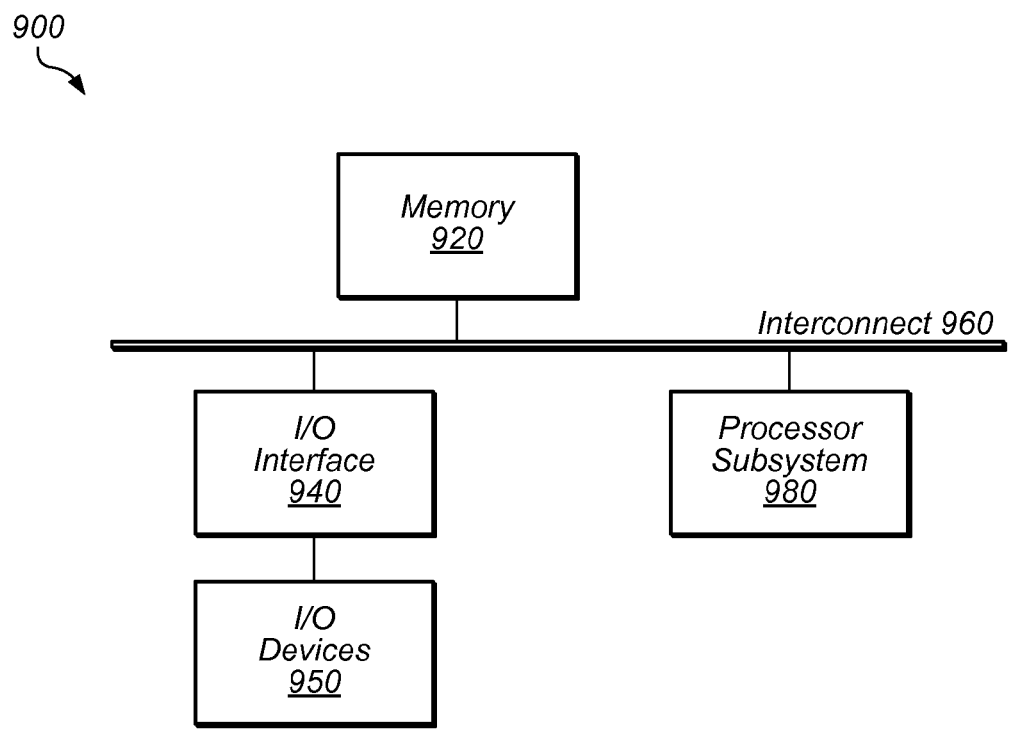
FIG. 9 is a block diagram illustrating one embodiment of an exemplary computer system.

Turning now to FIG. 9, one embodiment of an exemplary computer system 900, which may include processor 10, is depicted. Computer system 900 includes a processor subsystem 980 that is coupled to a system memory 920 and I/O interfaces(s) 940 via an interconnect 960 (e.g., a system bus). I/O interface(s) 940 is coupled to one or more I/O devices 950. Computer system 900 may be any of various types of devices, including, but not limited to, a server system, personal computer system, desktop computer, laptop or notebook computer, mainframe computer system, handheld computer, workstation, network computer, a consumer device such as a mobile phone, pager, or personal data assistant (PDA). Computer system 900 may also be any type of networked peripheral device such as storage devices, switches, modems, routers, etc. Although a single computer system 900 is shown for convenience, system 900 may also be implemented as two or more computer systems operating together.

Processor subsystem 980 may include one or more processors or processing units. For example, processor subsystem 980 may include one or more processing units (each of which may have multiple processing elements or cores) that are coupled to one or more resource control processing elements 920. In various embodiments of computer system 900, multiple instances of processor subsystem 980 may be coupled to interconnect 960. In various embodiments, processor subsystem 980 (or each processor unit or processing element within 980) may contain a cache or other form of on-board memory. In one embodiment, processor subsystem 980 may include processor 10 described above.

System memory 920 is usable by processor subsystem 980. System memory 920 may be implemented using different physical memory media, such as hard disk storage, floppy disk storage, removable disk storage, flash memory, random access memory (RAM-SRAM, EDO RAM, SDRAM, DDR SDRAM, RAMBUS RAM, etc.), read only memory (PROM, EEPROM, etc.), and so on. Memory in computer system 900 is not limited to primary storage such as memory 920. Rather, computer system 900 may also include other forms of storage such as cache memory in processor subsystem 980 and secondary storage on I/O Devices 950 (e.g., a hard drive, storage array, etc.). In some embodiments, these other forms of storage may also store program instructions executable by processor subsystem 980.

I/O interfaces 940 may be any of various types of interfaces configured to couple to and communicate with other devices, according to various embodiments. In one embodiment, I/O interface 940 is a bridge chip (e.g., Southbridge) from a front-side to one or more back-side buses. I/O interfaces 940 may be coupled to one or more I/O devices 950 via one or more corresponding buses or other interfaces. Examples of I/O devices include storage devices (hard drive, optical drive, removable flash drive, storage array, SAN, or their associated controller), network interface devices (e.g., to a local or wide-area network), or other devices (e.g., graphics, user interface devices, etc.). In one embodiment, computer system 900 is coupled to a network via a network interface device.

Program instructions that are executed by computer systems (e.g., computer system 900) may be stored on various forms of computer readable storage media. Generally speaking, a computer readable storage medium may include any storage media readable by a computer to provide instructions and/or data to the computer. For example, a computer readable storage medium may include storage media such as magnetic or optical media, e.g., disk (fixed or removable), tape, CD-ROM, or DVD-ROM, CD-R, CD-RW, DVD-R, DVD-RW, or Blu-Ray. Storage media may further include volatile or non-volatile memory media such as RAM (e.g. synchronous dynamic RAM (SDRAM), double data rate (DDR, DDR2, DDR3, etc.) SDRAM, low-power DDR (LP-DDR2, etc.) SDRAM, Rambus DRAM (RDRAM), static RAM (SRAM), etc.), ROM, Flash memory, non-volatile memory (e.g. Flash memory) accessible via a peripheral interface such as the Universal Serial Bus (USB) interface, etc. Storage media may include microelectromechanical systems (MEMS), as well as storage media accessible via a communication medium such as a network and/or a wireless link.

In some embodiments, a computer-readable storage medium can be used to store instructions read by a program and used, directly or indirectly, to fabricate hardware for processor 10 described above. For example, the instructions may outline one or more data structures describing a behavioral-level or register-transfer level (RTL) description of the hardware functionality in a high level design language (HDL) such as Verilog or VHDL. The description may be read by a synthesis tool, which may synthesize the description to produce a netlist. The netlist may comprise a set of gates (e.g., defined in a synthesis library), which represent the functionality of processor 10. The netlist may then be placed and routed to produce a data set describing geometric shapes to be applied to masks. The masks may then be used in various semiconductor fabrication steps to produce a semiconductor circuit or circuits corresponding to processor 10.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A processor, comprising:
   a branch prediction unit configured to predict directions and target addresses of control transfer instructions in a sequence of instructions to be issued by the processor for execution;
   a pattern detection unit configured to detect a pattern based on the directions and the target addresses;
   a replay unit configured to store target addresses of the sequence of instructions, wherein the replay unit is configured to provide, in response to the pattern detection unit detecting the pattern, the stored target addresses to an instruction fetch unit to cause the instruction fetch unit to re-fetch instructions of the sequence of instructions until a misprediction of a control transfer instruction is detected.

2. The processor of claim 1, further comprising:
   the instruction fetch unit having a program counter register, wherein the instruction fetch unit is configured to fetch instructions based a value of a program counter in the program counter register, and wherein the instruction fetch unit is configured to update the value of the program counter based on a target address provided by the replay unit; and
   a wherein, in response to detecting the misprediction, the processor is configured to re-initiate issuing instructions predicted to be issued by the branch prediction unit.

3. The processor of claim 1, further comprising:
   a multiplexer unit configured to select between addresses predicted to be issued by the branch prediction unit and addresses provided by the replay unit, wherein the multiplexer is configured to provide the selected addresses to the instruction fetch unit to cause instructions corresponding to the selected addresses to be issued by the processor, and wherein, in response to the pattern detection unit detecting the pattern, the multiplexer unit is configured to select the addresses provided by the replay unit.

4. The processor of claim 1, wherein the branch prediction unit is configured to maintain branch history information, and wherein the processor is configured to decrease power consumption of the branch prediction unit by causing the branch prediction unit to discontinue using the branch history information until a misprediction is detected.

5. The processor of claim 1, wherein the replay unit is configured to store sequential addresses and provide the sequential addresses to the instruction fetch unit to cause the instructions of the sequence of instructions to be re-fetched.

6. The processor of claim 1, wherein the pattern detection unit is configured to detect the pattern by detecting a pattern in global history information, wherein the global history information includes a sequence of directions previously taken by a plurality of control transfer instructions.

7. The processor of claim 1, wherein the pattern detection unit is configured to detect the pattern by detecting a pattern in local history information, wherein the local history information includes a sequence of directions previously taken by a particular control transfer instruction.

8. The processor of claim 1, wherein the pattern detection unit is configured to detect the pattern by detecting both a pattern in a sequence of predicted target addresses and a pattern in global history information associated with the sequence of predicted target addresses.

9. The processor of claim 1, further comprising:
a loop iteration predictor configured to predict when a loop in the sequence of predicted instructions is to be exited, and wherein, in response to the loop iteration predictor predicting that the loop is to be exited, the processor is configured to discontinue repeatedly issuing the plurality of instructions and to re-initiate issuing instructions predicted to be issued by the branch prediction unit.

10. A processor, comprising:
a branch prediction unit configured to predict outcome information of branch instructions in a sequence of instructions to be issued by the processor, wherein the outcome information includes directional information and target addresses;
a pattern detection unit configured to detect a pattern in the directional information and the target addresses;
wherein, in response to the pattern detection unit detecting the pattern, the processor is configured to reduce power consumption of the branch prediction unit and to cause instructions in the sequence of instructions to be issued; and
a replay unit configured to store a sequence of fetch addresses of the sequence of instructions corresponding to the pattern, and wherein the replay unit is configured to replay the stored sequence of fetch addresses to cause instructions in the sequence of instructions to be issued.

11. The processor of claim 10, wherein the branch prediction unit includes one or more target address prediction tables configured to maintain branch history information, and wherein to reduce the power consumption of the branch prediction unit, the processor is configured to discontinue usage of at least one of the one or more target address prediction tables.

12. The processor of claim 10, wherein the branch prediction unit includes a type detection unit configured to determine the types of control transfer instructions being issued by the processor, and wherein to reduce the power consumption of the branch prediction unit, the processor is configured to discontinue usage of the type detection unit.

13. The processor of claim 10, wherein the branch prediction unit includes a loop iteration predictor configured to predict a number of iterations to be performed in a loop, and wherein to reduce the power consumption of the branch prediction unit, the processor is configured to discontinue usage of the loop iteration predictor.

14. The processor of claim 10, further comprising:
a replay unit configured to store a sequence of fetch addresses of the plurality of instructions included in the pattern, and wherein the replay unit is configured to replay the stored sequence of fetch addresses to cause the instructions in the sequence of instructions to be issued.

15. The processor of claim 14, wherein the pattern detection unit is configured to provide the sequence of fetch addresses to the replay unit, and wherein the pattern detection unit is configured to remove, from the provided sequence of fetch addresses, redundant fetch addresses that cause the same cache line to be re-fetched.

16. A method, comprising:
a processing element predicting a sequence of instructions to be issued by the processing element for execution, wherein the predicting includes predicting directions and target addresses of control transfer instructions in the sequence of instructions;
the processing element detecting, based on the predicted directions and target addresses, a pattern associated with the predicted sequence of instructions; and
in response to detecting the pattern, the processing element switching from issuing instructions predicted by the branch prediction unit to issuing instructions identified by target addresses provide by a replay unit to an instruction fetch unit of the processing element.

17. The method of claim 16, wherein the switching decreases a power consumption of a branch prediction unit of the processing element until a misprediction of a control transfer instruction is detected, wherein the control transfer instruction implements a loop.

18. A computer readable storage medium comprising a data structure which is operated upon by a program executable on a computer system, the program operating on the data structure to perform a portion of a process to fabricate an integrated circuit including circuitry described by the data structure, the circuitry described by the data structure including:
a pattern detection unit configured to detect a pattern in branch directions and target addresses predicted by a branch prediction unit of the integrated circuit to be issued by the integrated circuit; and
a replay unit configured to provide, in response to the pattern detection unit detecting the pattern, ones of the target addresses to an instruction fetch unit to cause the integrated circuit to switch from issuing instructions predicted by the branch prediction unit to issuing instructions associated with the provided target addresses.

19. The computer readable storage medium of 18, wherein the storage medium stores hardware description language (HDL) data, Verilog data, or graphic database system II (GDSII) data.

* * * * *